Oct. 9, 1945.  E. W. NORTH ET AL  2,386,629
HOSE CLAMP
Filed May 31, 1943  2 Sheets-Sheet 1
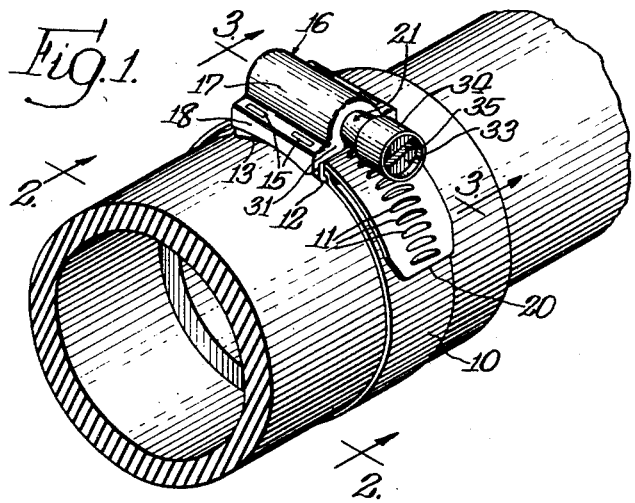
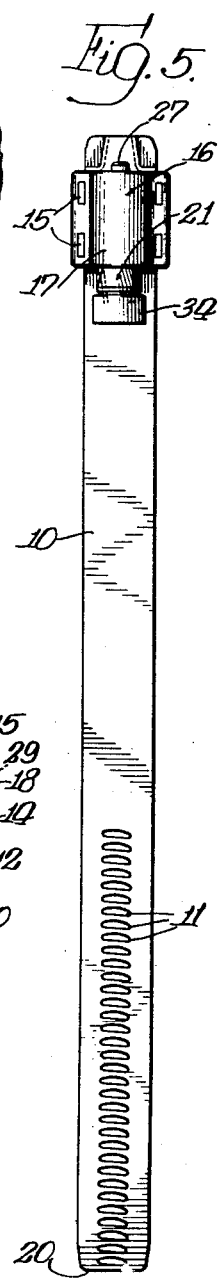
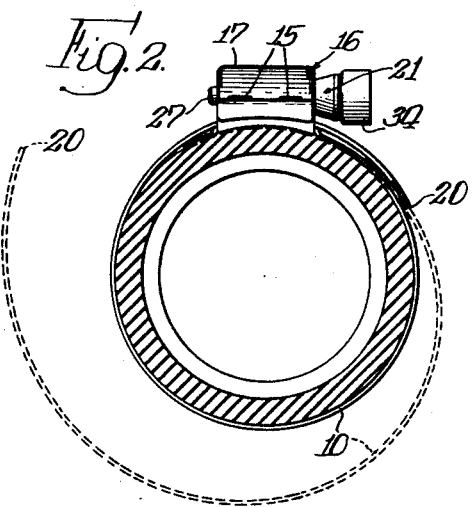
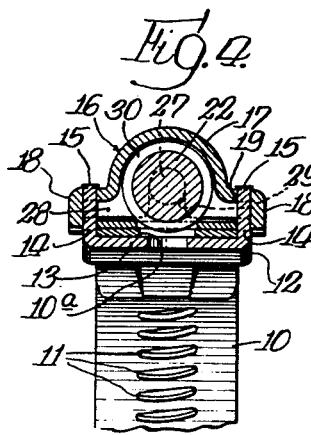
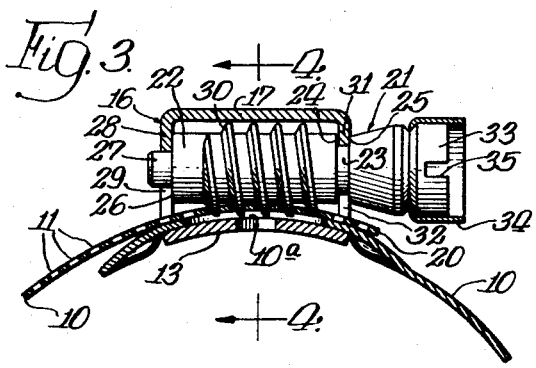
INVENTORS.
Edwin W. North.
BY William O. Burke.

Oct. 9, 1945.  E. W. NORTH ET AL  2,386,629
HOSE CLAMP
Filed May 31, 1943  2 Sheets-Sheet 2
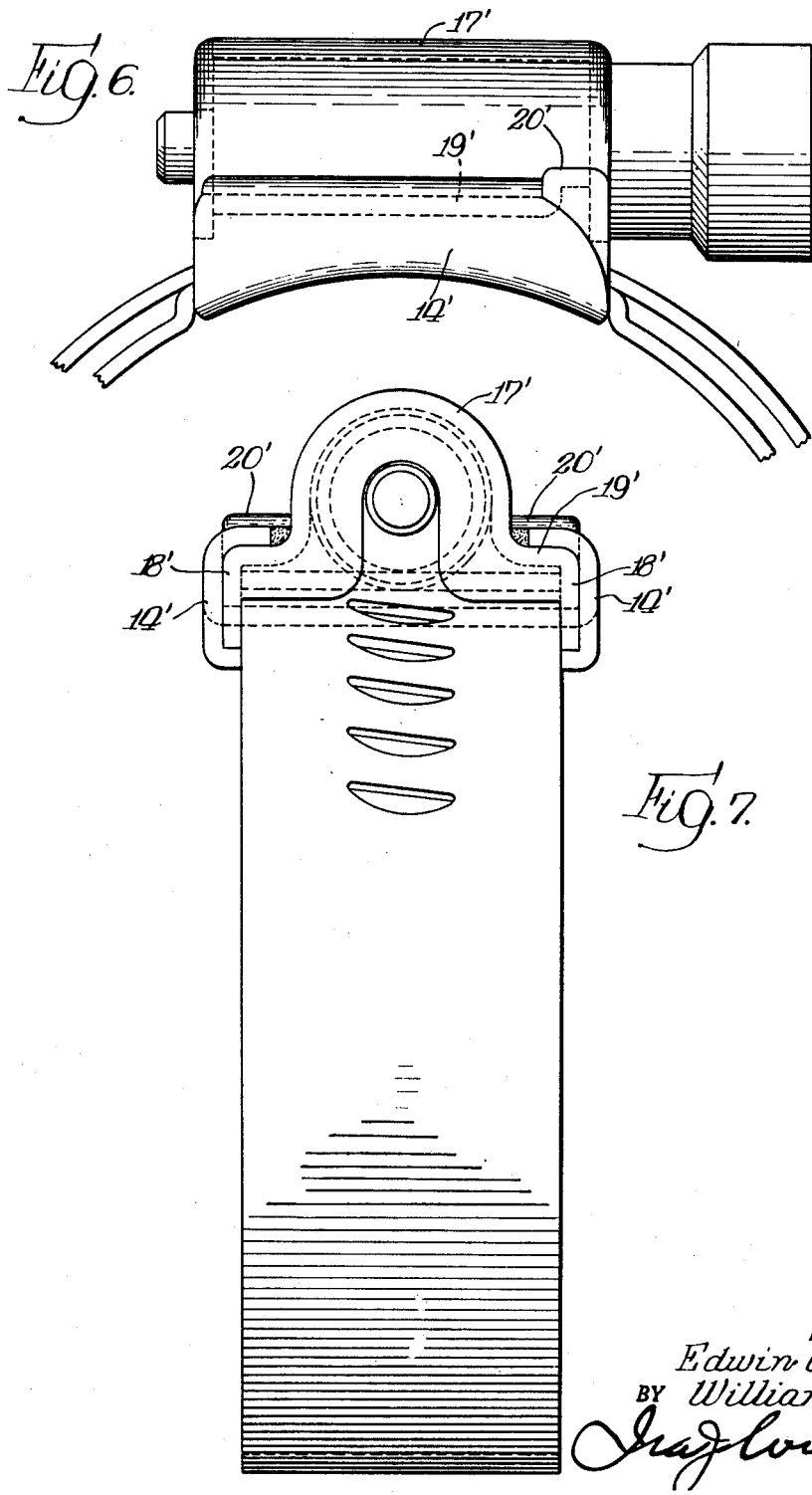
INVENTOR.
Edwin W. North,
BY William O. Burke.

Patented Oct. 9, 1945

2,386,629

UNITED STATES PATENT OFFICE 2,386,629

HOSE CLAMP

Edwin W. North and William O. Burke, Rockford, Ill., assignors to National Lock Co., Rockford, Ill., a corporation of Delaware Application May 31, 1943, Serial No. 489,110

5 Claims. (Cl. 24—19)

This invention relates to a clamp for hose employed in conducting compressed air, gasoline or other fluids in aircraft and other constructions.

Among the objects of our invention is to provide a hose clamp which may be applied without disconnecting the hose from the tube or fittings around which it extends.

Another object of our invention is to provide a hose clamp which will be suitable for use with quite a wide variety of hose sizes so as to substantially reduce the number of sizes of clamps required to cover the range of hose diameters used.

Another object of our invention is to provide a clamp which will be strong and durable, positive in action and capable of economical production. Our invention contemplates other objects, advantages and capabilities, as will later more fully appear and which are inherently possessed by our invention.

While we have shown in the accompanying drawings a preferred form of our invention, yet we desire it understood that it is susceptible of modification and change without departing from the spirit of our invention.

Referring to the drawings,

Fig. 1 is a perspective view of our hose clamp in position on a hose;

Fig. 2 is a sectional view on line 2—2 of Fig. 1;

Fig. 3 is a sectional view on line 3—3 of Fig. 1;

Fig. 4 is a sectional view on line 4—4 of Fig. 3;

Fig. 5 is a top plan view of our band with one end removed from the housing;

Fig. 6 is a side elevation illustrating a modification of the casing structure; and Fig. 7 is an end elevation looking toward the left at Fig. 6.

The preferred embodiment of our invention comprises a band 10 of suitable material, preferably resilient spring steel having a transversely flat end portion, provided with a series of longitudinally spaced transversely extending slots or elongated apertures 11. These slots are of a character capable of being produced by a stamping operation and are so shaped and positioned on an incline transversely as to conform to and receive the spiral thread of a tightening and holding screw to be later described.

A saddle 12 of substantially U-shape comprising the base 13 slightly curved longitudinally (Fig. 3) and upwardly extending side walls 14 is rigidly secured to the band 10 near the inner end thereof by spot welding. That portion of the band overlying the base 13 is upwardly offset an amount equal to the thickness of the base, so that the inner curved surface of the base forms in effect for clamping purposes a continuation of the inner surface of the band.

A housing 16 comprising a central longitudinally extending semi-cylindrical portion 17 flanked by horizontally extending portions 19 terminating in depending flanges 18 cooperates with the saddle to provide a screw casing. To this end the horizontal portions are provided with openings to receive the prongs 15 projecting upwardly from the saddle side walls. The ends of the prongs projecting through these openings are riveted over to securely and rigidly connect the saddle and housing together.

In the modification illustrated in Figs. 6 and 7 the side walls 14' of the saddle are disposed outside of and embrace the side walls 18' of the housing, and the upper margins thereof are clinched over the horizontal portions 19' of the housing, as shown. To resist relative displacement of the saddle and housing caused by induced end thrust of the saddle, the horizontal portions 19' of the housing are struck up at one end to provide abutment shoulders 20' against which the opposed ends of the clinched margins of walls 14' are thrust.

The end walls 28 and 31 of the housing are spaced away from the saddle sufficiently to accommodate the overlapping end 20 of the band, as shown in Fig. 3. These ends are also provided respectively with slots 29 and 32 to accommodate the reduced portions 27 and 23 of a screw 22 which is positioned in said slots before the housing and saddle are connected. The shoulders 24, 25 and 26 engaging the housing end walls adjacent to the slots afford integral means to prevent longitudinal displacement of the screw under stress, thus avoiding the necessity of washers or riveted parts which are prone to give way in use.

The body portion of screw 22 has a continuous spiral thread 30 integrally formed therewith and of substantial height. When screw 22 is positioned, as previously described, in housing 16, it is carried by the housing secured to one end of the band 10 and is so disposed that its thread 30 will protrude through slots 11 and into the elongated slot 10ᵃ formed in the underlying portion of the band 10. The screw 22 has a head 33 including a tapered portion 21 adjacent to the shoulder 25 which serves to divert or direct inwardly the end 20 of the band as it emerges from the housing, thereby preventing obstruction to the clamping movement of the band by the head of the screw. A sleeve 34 rotatably attached to the head 33 extends beyond the head, so as to afford a guide for a screw driver to prevent accidental slipping out of the screw driver from kerf 35 when turning of the screw becomes necessary.

In use, by turning screw 22 counter-clockwise sufficiently, the end 20 of band 10 will be backed out of the casing, thereby permitting the positioning of the clamp around a hose without disconnecting the hose from the fittings. The outer end 20 may then be reinserted in the casing into cooperative relation with the screw, whereupon rotation of the screw will draw the band through the casing to securely clamp and hold an encircled hose.

The slots 11, shaped to correspond with the contour of the screw thread, present large areas at one side thereof for contact with the spiral thread 30, thus providing strength for clamping purposes and minimizing wear. It will be apparent from Figs. 3 and 4 that the working or back faces of screw thread 30 are flat so as to present maximum surface for engagement with the band, and that the front faces are inclined or tapered to provide strength and reinforcement of the thread while permitting the retention of a maximum of material between adjacent thread receiving apertures or slots in the band, particularly between the outer ends of adjacent apertures. The large number of slots 11 in the band 10 enables one size of clamp to be used on a wide range of hose sizes. The short length of the saddle 12 and its curved inner contour contribute toward the attainment of a leak-proof contact with the hose in use. The tightening of the screw 22 creates a wrapping action which causes the band 10 to snugly clamp the hose with a uniform pressure entirely around its perimeter.

The structural details disclosed may obviously be varied within considerable limits without departing from our invention as defined in the following claims.

We claim:

1. A hose clamp, comprising a transversely flat metal band adapted to embrace a hose to be clamped, a housing rigidly attached to one end of said band and shaped to permit the extension of the free end of said band therethrough, and a screw rotatably mounted in said housing, said screw consisting of a cylindrical body provided with a spiral thread presenting a substantially flat working face in one direction and a transversely curved face in the opposite direction, said free end of the band being provided with a series of spaced apart slots each having a straight wall adapted to be engaged by the flat working face of said screw thread and a curved wall shaped to accommodate the curved face of said thread.

2. A hose clamp, comprising a metal band adapted to surround a hose, a housing mounted on one end of said band, the other end of the band being provided with a series of spaced apart transversely extending slots each bounded on one side by a straight wall and on the other by a concave wall, and a screw rotatably mounted in said housing, said screw being provided with a spiral thread presenting in a plane tangent to the body of the screw a flat working face and a convex face, said screw thread and slots being complemental in shape.

3. A hose clamp, comprising a transversely flat metal band adapted to embrace a hose to be clamped, a housing rigidly attached to one end of said band and shaped to permit the extension of the free end of said band therethrough, and a screw rotatably mounted in said housing, said screw consisting of a cylindrical body provided with a tapered spiral thread presenting a substantially flat working face in one direction and an inclined face in the opposite direction, said free end of the band being provided with a series of spaced apart slots each having a straight wall adapted to be engaged by the flat working face of said screw thread and a curved wall shaped to accommodate the inclined face of said thread.

4. A hose clamp, comprising a metal band adapted to surround a hose, a housing mounted on one end of said band and shaped to permit the extension of the free end of said band therethrough, the free end of said band being provided with a series of spaced apart transversely extending slots and a screw having a spiral thread within the housing shaped to engage in said slots, said screw being provided outside the housing with a head tapered toward the housing to present an inclined face for directing the free end of the band projected through the housing inwardly toward the hose and away from said head.

5. A hose clamp, comprising a metal band adapted to surround a hose, a housing mounted on one end of said band, the other end of the band being provided with a series of spaced apart transversely extending slots, each bounded on one side by a straight wall and on the other by a concave wall, and a screw rotatably mounted in said housing, said screw being provided with a spiral thread presenting in a plane tangent to the body of the screw a flat working face and a convex face, said screw thread and slots being complemental in shape, the head of the screw outside said housing being tapered toward the housing to present an inclined face for directing the free end of the band extending through said housing inwardly toward the hose and away from said head.

EDWIN W. NORTH.
WILLIAM O. BURKE.